United States Patent
Vockler et al.

(10) Patent No.: US 7,531,242 B2
(45) Date of Patent: *May 12, 2009

(54) SILICONE-COATED ARCHITECTURAL GLASS

(75) Inventors: Larry D. Vockler, Vancouver, WA (US); Robert J. Wampler, Gresham, OR (US)

(73) Assignee: Industrial Control Development, Inc., Vancouver, WA (US)

( * ) Notice: Subject to any disclaimer, the term of this patent is extended or adjusted under 35 U.S.C. 154(b) by 425 days.

This patent is subject to a terminal disclaimer.

(21) Appl. No.: 11/449,466

(22) Filed: Jun. 8, 2006

(65) Prior Publication Data

US 2007/0078337 A1    Apr. 5, 2007

Related U.S. Application Data

(63) Continuation-in-part of application No. 11/241,191, filed on Sep. 30, 2005, now Pat. No. 7,309,734.

(51) Int. Cl.
*B32B 9/04* (2006.01)
*C08L 83/04* (2006.01)

(52) U.S. Cl. ............. 428/450; 428/428; 428/447; 428/429; 525/477; 525/478; 525/479; 528/15; 528/31; 528/32; 524/588

(58) Field of Classification Search ............... None
See application file for complete search history.

(56) References Cited

U.S. PATENT DOCUMENTS

| | | | |
|---|---|---|---|
| 3,889,023 A | | 6/1975 | Plueddemann |
| 4,115,356 A | | 9/1978 | Hilliard |
| 4,163,081 A | | 7/1979 | Schulz |
| 4,495,340 A | | 1/1985 | Blizzard et al. |
| 4,814,230 A | | 3/1989 | Vockler |
| 4,946,893 A | * | 8/1990 | Saito et al. .......... 524/862 |
| 5,364,921 A | | 11/1994 | Gray et al. |
| 5,521,245 A | * | 5/1996 | Hirabayashi et al. ..... 524/493 |
| 6,017,587 A | * | 1/2000 | Kleyer et al. .......... 427/387 |
| 6,838,499 B2 | * | 1/2005 | Kimura .............. 524/268 |
| 2006/0177673 A1 | * | 8/2006 | Ikeno et al. .......... 428/447 |

* cited by examiner

*Primary Examiner*—Marc S Zimmer
(74) *Attorney, Agent, or Firm*—Chernoff Vilhauer McClung & Stenzel, LLP

(57) ABSTRACT

An extremely durable, stable and fast-curing elastomeric composition suitable for coating all types of architectural glass is disclosed.

21 Claims, No Drawings

SILICONE-COATED ARCHITECTURAL GLASS

CROSS-REFERENCE TO RELATED APPLICATIONS

This is a continuation-in-part of application Ser. No. 11/241,191 filed Sep. 30, 2005, now U.S. Pat. No. 7,309,734 the priority of which is claimed pursuant to 35 USC 120.

BACKGROUND OF THE INVENTION

In recent years there has been increasing use of coated glass in the construction industry, especially in spandrel and interior design applications, since such glass is substantially less expensive than conventional exterior materials such as brick and granite and presents aesthetically appealing design choices for both exteriors and interiors. Metallic coatings have been applied by low temperature vacuum deposition and by high temperature pyrolitic methods in order to enhance both the aesthetic appeal and reflective character of such glass, the latter conserving energy in air-conditioned buildings. Ceramic frit coatings or so-called "ceramic enamels" have been used to color and to opacify pyrolitic metal-coated glass. However, ceramic frit coatings may not be used to coat glass that has been metal-coated by vacuum deposition because the approximately 1400° C. temperature required to apply the coatings distorts and melts the vacuum deposition metallic coating. Another drawback of the high temperature firing required to apply ceramic frit coatings is that it severely limits the number of color choices.

One recent attempt to overcome the problem of attempting to apply a ceramic frit coating over a vacuum-deposition metallic coating has been the development of a so-called "post-temperable" metallic-coated glass. This type of glass is prepared by applying an intermediate silicon layer over the metallic coating, curing the intermediate layer, then depositing the so-coated glass substrate in a tempering oven, whereupon the ceramic frit coating is then applied at an elevated temperature. The principal drawback of this procedure is that the temperature range that may be used to successfully apply the ceramic frit coating is very narrow.

The use of curable elastomeric silicone compositions for coating substrates such as steel and glass is known. See, for example, U.S. Pat. Nos. 3,889,023, 4,115,356, 4,163,081, 4,495,340 and 5,364,921. The use of such compositions for coating and reinforcement of architectural spandrel-type glass is also known. See commonly owned U.S. Pat. No. 4,814,230. There are a number of drawbacks of currently available elastomeric coatings for glass: they often are applied with solvents, thereby complicating application and lengthening curing times; many contain volatile organic compounds (VOCs), requiring measures to protect both workers and the environment; many are chemically unstable at higher temperatures; they usually have a relatively short shelf life; and, perhaps most importantly, they have insufficient adherence to meet four-sided structural glazing specifications.

There is therefore a need in the industry for a glass coating that enhances the tensile strength of all types of construction or architectural grade glass, that can render the same opaque and impart a large spectrum of colors thereto, that has a very rapid curing time, that has no VOCs and a 100% solids content, that can withstand the elements, that is chemically stable at higher temperatures, that has a long shelf life, that bonds to either glass substrates or to the metallic-coated side of glass substrates sufficiently to meet four-sided structural glazing specifications and that may be applied and cured at relatively cool temperatures so as not to distort or melt the metallic coating on glass. These needs are met by the present invention, which is summarized and described in detail below.

BRIEF SUMMARY OF THE INVENTION

There are several aspects to the present invention. In a first aspect, the invention provides a 100% solids-containing flowable elastomeric composition for coating glass, and in particular for coating glass used in building construction applications.

In a second aspect, the invention provides a novel composite article comprising a glass substrate coated with the aforementioned elastomeric composition. In a third aspect, the invention provides a novel composite article comprising a metal-coated glass substrate wherein the metallic coating may be coated with the aforementioned elastomeric composition, regardless of whether the metallic coating has been applied by a high temperature pyrolitic method or a low temperature vacuum deposition method.

When stored in two separate components prior to application, the composition exhibits a shelf life of up to a year. Once the two components of the composition are mixed, the resulting coating is chemically stable up to 260° C., and easily passes all known tests for UV, humidity and adhesion, and bonds sufficiently to glass to permit the coated glass to meet four-sided structural glazing specifications. The composition is non-flammable, solventless, contains no VOCs, making it environmentally safe, is roll-coatable at relatively low temperatures, may be left on coating equipment for extended periods without cleaning and, due to its relatively low temperature application and cure, may be used with virtually any pigment without altering the pigment, thus making it available in a wide variety of colors.

DETAILED DESCRIPTION OF PREFERRED EMBODIMENTS

As used in the specification and claims, the term "about" means the stated value ±10% of that value, and the phrase "approximate weight percentages" means the wt % noted ±1 wt % when referring to whole numbers and the wt % noted ±0.1 wt % when referring to decimals. For example, reference to 75 wt % preceded by "approximate weight percentage" means 75 wt %±1 wt %, or 74-76 wt %, while reference to 0.5 wt % preceded by the same phrase means 0.5 wt %±0.1 wt %, or 0.4-0.6 wt %.

The Substrate

The coating composition of the invention may be applied to virtually any glass substrate, coated or uncoated. As mentioned above, in commercial building and architectural spandrel applications, there are commonly encountered vacuum-deposited and pyrolitically formed reflective metal-coated plate glass; these two types are also suitable substrates for the coating composition of the invention.

The Coating Composition

The coating composition of the invention comprises a crosslinked polyvinylsiloxane/liquid silicone rubber (PVS/LSR) component modified by up to five other components.

The PVS/LSR component is commercially available from Dow Corning® and comes as a two-part product (Part A and Part B) which, when the two parts are combined and heated, forms the crosslinked PVS/LSR component. Part A of the Dow Corning® PVS/LSR composition consists of the following three components: (1) dimethylvinyl-terminated dimethylsiloxane; (2) dimethylvinylated, trimethylated silica; and (3) dimethylvinyl-terminated dimethyl, methylvinyl siloxane. Component (4) of Part A is a catalyst comprising a platinum metal complex. As used herein, the term "platinum metal" means a metal selected from the group consisting of platinum (Pt), palladium (Pd), ruthenium (Ru), rhodium (Rh), osmium (Os) and iridium (Ir). Preferred catalysts are Pt and Rh, especially the latter. A preferred form of the Rh catalyst is a 20 wt % trichlorotris (dibutylsulfide) rhodium complex in toluene containing from about 2.9 to about 3.3 wt % Rh. When used in this form in the preferred amount of from about 0.003 to about 0.012 wt % complex, the total amount of Rh metal in the composition is from about 100 to about 400 ppm or from about 0.0001 to about 0.0005 wt %.

Part B of the PVS/LSR complex consists of the same components (1)-(3) of Part A plus dimethyl, methylhydrogen siloxane. Part A and Part B together preferably make up from about 75 to about 90 wt % of the inventive composition based upon the entire weight of all components in the composition of the invention, which is the convention used for all references to wt % in this specification and in the claims.

One of the five potential PVS/LSR-modifying components is optional additional catalyst. To enhance and accelerate crosslinking, a known hydrosilylation catalyst, in the form of a platinum complex, is initially included in Part A of the PVS/LSR composition. An especially preferred Pt catalyst is a platinum-divinyltetramethyl disiloxane complex in a vinyl silicone solution that contains 2-4 wt % Pt metal. The catalyst-containing solution is preferably present in an amount of from about 0 to about 0.2 wt %.

Another PVS/LSR-modifying agent comprises two types of a rheology- or flowability-enhancing agent, which may be present in a total amount of up to about 20 wt %. Preferred agents of this type are vinyl-terminated dimethylsiloxane, and hydrogen-terminated dimethlysiloxane. The hydrogen-terminated dimethylsiloxane with a SiH content measured as H of 0.01 to 2 wt % is capable of crosslinking with the vinyl-terminated dimethylsiloxane with an active vinyl content of 0.2 to 3 wt % and it is preferred that the vinyl-terminated siloxane is initially present in part A of the PVS/LSR composition in an amount of from about 1 to about 10 wt %, more preferably from about 5 to about 9 wt %, while the hydrogen-terminated dimethylsiloxane is preferably initially present in part B of the PVS/LSR composition in an amount of from about 0 to about 10 wt %, more preferably from about 0 to about 5 wt %.

The above-mentioned flowability-enhancing agents should be present in an amount so as to render the composition sufficiently viscous that it may be applied to the glass substrate by roller coating, and that, upon application, the composition readily adheres to the substrate. Viscosity may range widely, depending upon the speed and thickness of application, from about 70,000 to about 120,000 Centipoise.

A further PVS/LSR-modifying agent is a coupling agent/adhesion promoter comprising a mixture of methylhydrogen siloxane and methylhydrogen cyclosiloxanes with a SiH content measured as H of 0.1 to 2%, which may be present in an amount from about 1 to about 10 wt %, preferably from about 5 to about 10 wt %. This coupling agent/adhesion promoter is preferably initially present in Part B of the PVS/LSR composition.

Finally, the PVS/LSR composition may contain pigment, which may be present in an amount of from 0 to about 6 wt %, more preferably about 1 wt %. The pigment may be of any type or in any form that is compatible with the composition and is capable of rendering the same colored or substantially opaque. Preferred examples are inorganic pigments such as iron oxides, titanium dioxide, and treated micas; and organic colors such as carbon black; and mixtures thereof, all in dry or powdered form.

In summary, prior to application, the elastomeric composition of the invention comprises the following components in the approximate weight percentages noted:
(a) 75-90 wt % of a crosslinked polyvinylsiloxane/liquid silicone rubber component which, prior to crosslinking, contains the following components: dimethylvinyl-terminated dimethylsiloxane; dimethylvinylated, trimethylated silica; dimethyl-terminated dimethyl, methylvinyl siloxane; dimethyl, methylhydrogen siloxane; and a platinum metal complex as a catalyst;
(b) 1-10 wt % of a mixture of methylhydrogen siloxane and methylhydrogen cyclosiloxanes as a coupling agent/adhesion promoter;
(c) 1-10 wt % vinyl-terminated dimethylsiloxane as a flowability-enhancing agent;
(d) 1-10 wt % hydrogen-terminated dimethylsiloxane as a flowability-enhancing agent; and
(e) 0-6 wt % pigment.

Application of the Coating

The composition is preferably applied to the glass substrate by conventional roller coating. The coating should be applied in a film averaging from about 4 to about 8 mils in thickness.

Curing of the composition may be effected by air, by heat or by infrared (IR) radiation. Of these, an IR radiation cure at 145°-175° C. at ambient relative humidity is preferred, more preferably at about 145°-155° C., whereby the cure is generally substantially complete within two minutes, depending upon coating thickness, glass thickness, pigment chosen and ambient temperature. The coated glass product is generally sufficiently cool to permit shipping and handling within several minutes, depending upon glass thickness.

Example 1

A 6 mm-thick pane of architectural grade spandrel-type glass having a vacuum-deposited titanium oxide reflective coating applied to one side thereof was washed with hot water and detergent and allowed to dry. Equal amounts making up 43 wt % of each of Parts A and B of Dow Corning® PVS/LSR 3730 composition containing Pt catalyst in Part A were added to two separate blending vessels and agitated slowly while adding thereto the following components in the wt % noted below.

To Part A 6 wt % vinyl-terminated dimethylsiloxane 1 wt % low sulfur-containing carbon black To Part B 4.5 wt % hydrogen-terminated dimethylsiloxane, 2.5 wt % mixture of methylhydrogen siloxane/methylhydrogen cyclosiloxane The so-modified Parts A and B were then mixed together until a homogenous composition was obtained. The resulting composition was applied in a substantially uniform coating averaging 5 mils in thickness to the metallic-coated side of the glass substrate by a Model 609RS roll coater system from The Wallace Company of Monrovia, Calif. and cured at 145° C. for 90 seconds under IR lamps at ambient relative humidity. After cooling for 5 minutes under a fan, the so-coated substrate was ready for handling and shipping. The coated glass exhibited less than 5% transmission of the visible light spectrum, rendering it substantially opaque.

Adhesion characteristics of the coating were initially tested by a modified STM C794-80 peel adhesion test and proved to be excellent. After 7000 hours of accelerated aging in a QUV weatherometer, run in alternating 4-hour cycles of exposure to 100% relative humidity at 40° C. followed by exposure to intense ultraviolet light at 60° C., a sample of the silicone-coated glass was colorfast, solid and uncracked, with no adhesion loss.

In another test, another sample of the so-coated glass was exposed to constant ultraviolet light for 6 months. The coating remained colorfast and uncracked with excellent adhesion.

Other tests included contacting samples of the coated glass with boiling water for 250 hours and placing samples in an atmosphere of 100% relative humidity for 1000 hours, with both tests having no adverse impact on adhesion of the coating.

Example 2

Substantially the same procedure was followed as in Example 1 except that the following components were added to 40 wt % each of Parts A and B of the PVS/LSR composition:
To Part A
9 wt % vinyl-terminated dimethylsiloxane
1 wt % low sulfur-containing carbon black
To Part B
3.2 wt % hydrogen-terminated dimethylsiloxane
6.8 wt % mixture of methylhydrogen siloxane/methylhydrogen cyclosiloxane
Samples of the so-coated glass were also tested as in Example 1, with substantially the same results.

Example 3

Substantially the same procedure was followed as in Example 1 except that 0.006 wt % Rh complex [trichlorotris (dibutylsulfide)Rh] was substituted for the Pt catalyst in Part A, 43 wt % each of Parts A and B were used, and the following components were added to Part B of the PVS/LSR composition:
To Part B
2.5 wt % hydrogen-terminated dimethylsiloxane
4.5 wt % mixture of methylhydrogen siloxane/methylhydrogen cyclosiloxane
Samples of the so-coated glass were also tested as in Example 1, with substantially the same results.

Example 4

Substantially the same procedure was followed as in Example 3, except that 40 wt % of each of Parts A and B were used, and the following components were added to Parts A and B:
To Part A
9 wt % vinyl terminated dimethylsiloxane
1 wt % low sulfur-containing carbon black
To Part B
5 wt % hydrogen-terminated dimethylsiloxane
5 wt % mixture of methylhydrogen siloxane/methylhydrogen cyclosiloxane
Samples of the so-coated glass were also tested as in Example 1, with substantially the same results.

Example 5

Substantially the same procedure was followed as in Example 3, except that 40 wt % of each of Parts A and B were used and $TiO_2$ was substituted for carbon black, and the following components were added to Parts A and B:
To Part A
6 wt % vinyl terminated dimethylsiloxane
4 wt % $TiO_2$
To Part B
10 wt % mixture of methylhydrogen siloxane/methylhydrogen cyclosiloxane
Samples of the so-coated glass were also tested as in Example 1, with substantially the same results.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A composite article comprising a glass substrate coated with an elastomeric coating comprising the following components in the following approximate weight percentages:
   (a) 75-90 wt % of a crosslinked polyvinylsiloxane/liquid silicone rubber component which, prior to crosslinking, contains the following components: dimethylvinyl-terminated dimethylsiloxane; dimethylvinylated, trimethylated silica; dimethylvinyl-terminated dimethyl, methylvinyl siloxane; dimethyl, methylhydrogen siloxane; and a platinum metal complex as a catalyst;
   (b) 1-10 wt % of a mixture of methylhydrogen siloxane and methylhydrogen cyclosiloxanes as a coupling agent/adhesion promoter;
   (c) 1-10 wt % vinyl-terminated dimethylsiloxane as a flowability-enhancing agent;
   (d) 1-10 wt % hydrogen-terminated dimethylsiloxane as a flowability-enhancing agent; and
   (e) 0-6 wt % pigment.

2. The composite article of claim 1 wherein component (b) has an SiH content measured as H of from about 0.1 wt % to about 2 wt % component (c) has an active vinyl content of from about 0.2 wt % to about 3 wt %; and component (d) has an SiH content measured as H of from about 0.01 wt % to about 2 wt %.

3. The composite article of claim 1 wherein the catalyst complex in component (a) comprises a platinum metal selected from the group consisting of platinum, palladium, ruthenium, rhodium, osmium and iridium; and component (e) is selected from the group consisting inorganic and organic colors and mixtures thereof.

4. The composite article of claim 3 wherein said catalyst comprises a complex of rhodium and component (e) is selected from the group consisting of carbon black, titanium dioxide, iron oxides, treated micas, and mixtures thereof.

5. The composite article of claim 4 wherein said catalyst is the complex trichlorotris (dibutylsulfide) rhodium.

6. The composite article of claim 5 wherein the concentration of said complex is from about 0.003 to about 0.012 wt %.

7. The composite article of claim 4 wherein said glass substrate is selected from the group consisting of float glass, sputter-coated glass and pyrollitic glass.

8. The composite article of claim 4 wherein said glass substrate has a metallic coating thereon which is coated with said elastomeric coating.

9. The composite article of claim 8 wherein said metallic coating has been applied by a high temperature pyrolitic method.

10. The composite article of claim 8 wherein said metallic coating has been applied by a low temperature vacuum deposition method.

11. The composite article of claim 6 wherein said components are present in the following approximate weight percentages:
(a) 80-86 wt %;
(b) 2.5-7 wt %;
(c) 6-9 wt %;
(d) 3.2-4.5 wt %; and
(e) 1 wt %.

12. The composite article of claim 1 wherein said components are present in the following approximate weight percentages:
(a) 86 wt %;
(b) 2.5 wt %;
(c) 6 wt %; and
(d) 4.5 wt %.

13. The composite article of claim 11 wherein said components are present in the following approximate weight percentages:
(a) 80 wt %;
(b) 6.8 wt %;
(c) 9 wt %; and
(d) 3.2 wt %.

14. An elastomeric composition for coating a substrate selected from the group consisting of glass and metallic-coated glass comprising the following components in the following approximate weight percentages:
(a) 75-90 wt % of a crosslinked polyvinylsiloxane/liquid silicone rubber component which, prior to crosslinking, contains the following components: dimethylvinyl-terminated dimethylsiloxane; dimethylvinylated, trimethylated silica; dimethyl-terminated dimethyl, methylvinyl siloxane; dimethyl, methylhydrogen siloxane; and a platinum metal complex as a catalyst;
(b) 1-10 wt % a mixture of methylhydrogen siloxane and methylhydrogen cyclosiloxanes as a coupling agent/adhesion promoter;
(c) 1-10 wt % vinyl-terminated dimethylsiloxane as a flowability-enhancing agent;
(d) 1-10 wt % hydrogen-terminated dimethylsiloxane as a flowability-enhancing agent; and
(e) 0-6 wt % pigment.

15. The composition of claim 14 wherein component (b) has an SiH content measured as H of from about 0.1 wt % to about 2 wt %; component (c) has an active vinyl content of from about 0.2 wt % to about 3 wt %; and component (d) has an SiH content measured as H of from about 0.01 wt % to about 2 wt %.

16. The composition of claim 14 wherein component (b) has an SiH content measured as H of from about 0.1 wt % to about 2 wt %; component (c) has an active vinyl content of from about 0.2 wt % to about 3 wt %; and component (d) has an SiH content measured as H of from about 0.01 wt % to about 2 wt %.

17. The composition of claim 16 wherein said catalyst is a rhodium complex.

18. The composition of claim 17 wherein said rhodium complex is trichlorotris (dibutylsulfide) rhodium.

19. The composition of claim 18 packaged separately as components A and B and having the following makeup in the approximate weight percentages noted:
component A
(1) 37.5-45 wt % of a mixture comprising dimethylvinyl-terminated dimethylsiloxane; dimethylvinylated, trimethylated silica; dimethylvinyl-terminated dimethyl, methylvinyl siloxane; and a platinum metal complex as a catalyst;
(2) 1-10 wt % vinyl-terminated dimethylsiloxane; and
(3) 0-6 wt % pigment;
component B
(1) 37.5-45 wt % of a mixture comprising dimethylvinyl-terminated dimethylsiloxane; dimethylvinylated, trimethylated silica; dimethylvinyl-terminated dimethyl, methylvinyl siloxane; and dimethyl, methylhydrogen siloxane;
(2) 1-10 wt % hydrogen-terminated dimethylsiloxane; and
(3) 1-10 wt % of a mixture of methylhydrogen siloxane and methylhydrogen cyclosiloxanes.

20. The composition of claim 18 wherein said components are present in the following approximate weight percentages:
component A
(1) 43 wt %;
(2) 6 wt %; and
(3) 1 wt %.
component B
(1) 43 wt %;
(2) 4.5 wt %; and
(3) 2.5 wt %.

21. The composition of claim 18 wherein said components are present in the following approximate weight percentages:
component A
(1) 40 wt %;
(2) 9 wt %; and
(3) 1 wt %.
component B
(1) 40 wt %;
(2) 3.2 wt %; and
(3) 6.8 wt %.

* * * * *

UNITED STATES PATENT AND TRADEMARK OFFICE
CERTIFICATE OF CORRECTION

PATENT NO. : 7,531,242 B2
APPLICATION NO. : 11/449466
DATED : May 12, 2009
INVENTOR(S) : Vockler It is certified that error appears in the above-identified patent and that said Letters Patent is hereby corrected as shown below:

Column 5, line 4: Delete "STM" and insert --ASTM--.

Column 7, line 19: Delete "claim 1" and insert --claim 11--.

Column 8, lines 4-9: Delete the text, which merely repeats the text of claim 15, and substitute the following text:

The composition of claim 12 wherein the catalyst complex in component (a) comprises a platinum metal selected from the group consisting of platinum, palladium, ruthenium, rhodium, osmium and iridium; and component (c) is selected from the group consisting of carbon black, iron oxides, titanium oxide, zinc oxide, treated micas, inorganic and organic color and mixtures thereof.

Signed and Sealed this
Fifth Day of April, 2011

David J. Kappos
*Director of the United States Patent and Trademark Office*